G. H. C. WILLIAMS.
THREE TRACK SPIRAL GRAVITY CONVEYER.
APPLICATION FILED OCT. 10, 1908.
1,005,391.
Patented Oct. 10, 1911.
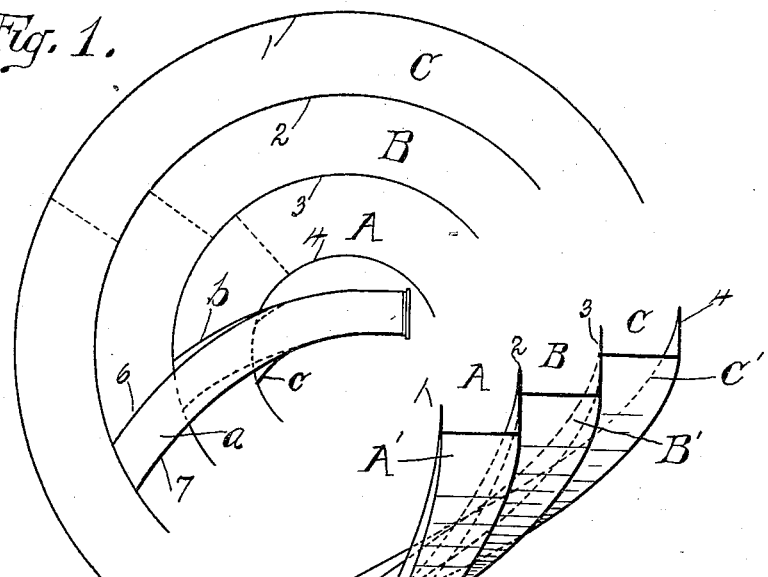
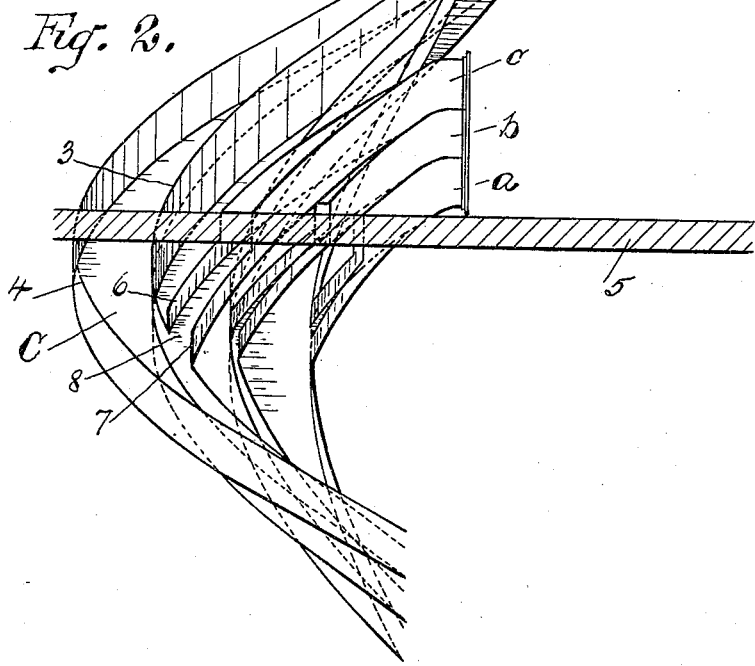

UNITED STATES PATENT OFFICE.

GEORGE H. C. WILLIAMS, OF METUCHEN, NEW JERSEY, ASSIGNOR TO OTIS ELEVATOR COMPANY, OF JERSEY CITY, NEW JERSEY, A CORPORATION OF NEW JERSEY.

THREE-TRACK SPIRAL GRAVITY-CONVEYER.

1,005,391.  Specification of Letters Patent.  Patented Oct. 10, 1911.

Application filed October 10, 1908. Serial No. 457,032.

*To all whom it may concern:*

Be it known that I, GEORGE H. C. WILLIAMS, a citizen of the United States, residing at Metuchen, in the county of Middlesex and State of New Jersey, have invented a new and useful Improvement in Three-Track Spiral Gravity-Conveyers, of which the following is a specification.

The present invention relates to spiral gravity conveyers adapted for use in stores, warehouses, or other buildings, for conveying boxes, packages or other articles from the higher to the lower floors of the building.

More specifically, the invention relates to a spiral conveyer of the above mentioned character having a plurality of concentrically arranged conveying surfaces, and one of the objects of the invention is the provision of an improved form of conveyer of this type.

Another feature of the invention resides in the means for feeding articles to the several conveying surfaces from the interior of the spiral.

Other objects of the invention will appear hereinafter, the novel combinations of elements being set forth in the appended claims.

Referring to the accompanying drawings which illustrate a construction embodying the present invention, Figure 1 is a plan view and Fig. 2 is an elevation of a portion of a conveyer comprising three conveying surfaces.

The conveyer as here shown comprises three concentrically arranged spiral troughs or chutes A, B and C having horizontally disposed surfaces A', B', C' and vertically disposed side walls or flanges 1, 2, 3 and 4. The intermediate flanges 2 and 3 each forms a side wall for the two adjacent conveying surfaces. The conveying surfaces A', B' and C' are preferably stepped so that each surface at any horizontal plane is higher than the next surface within the spiral.

The drawing shows the conveyer extending through a floor 5 of the building, but it will be understood that it may extend through any desired number of floors of a building. Adjacent the floor 5 is located a series of chutes or intakes $a$, $b$ and $c$ communicating respectively with the conveying surfaces A', B' and C'. The uppermost chute $a$ extends over the troughs A and B to the flange 3 which separates the sections B and C. The chute $c$ comprises the side walls 6 and 7 and the bottom surface 8, which latter may extend to the upper edge of the flange 3, so that articles placed within the chute $c$ will be conveyed by gravity into the section C of the main conveyer. The construction of the chutes $b$ and $a$ is similar to that of the chute $c$, except that they extend only to the inner edges of the sections B and A, respectively.

It will be understood that the chutes or intakes $a$, $b$ and $c$ may be arranged at any convenient position or height with respect to the floor 5, and that a series of these intakes may be provided at each of the intermediate floors of the building through which the main conveyer extends. As articles in their descent through the conveyer are always held by centrifugal force against the outer walls of the conveying sections, there will be no interference between articles entering the conveyer through one of the intakes $a$, $b$ or $c$ and articles descending from a higher floor.

Various changes in the details of construction and arrangement of parts might obviously be made by those skilled in the art without departing from the spirit and scope of the invention. The number of spiral conveying surfaces may also be varied as desired to suit the varying requirements and conditions found in practice. I wish therefore not to be limited to the exact construction herein disclosed.

What I claim as new and desire to secure by Letters Patent of the United States is:—

1. In a gravity conveyer, the combination of spiral conveying surfaces having different diameters and concentrically arranged one within the circumference of the other, and means for feeding articles to said surfaces from the interior of the spiral.

2. In a gravity conveyer, the combination with inner and outer spiral surfaces, of auxiliary conveying surfaces communicating therewith from the interior of the spiral.

3. In a gravity conveyer, the combination of concentric spiral chutes having different diameters and arranged one within another, and auxiliary chutes communicating therewith at intermediate points along the inner edges of said chutes.

4. In a gravity conveyer, the combination with spiral conveying surfaces having different diameters and arranged concentrically one within another, and chutes located one above the other and extending to the inner edges of said conveying surfaces.

In testimony whereof, I have signed my name to this specification in the presence of two subscribing witnesses.

GEORGE H. C. WILLIAMS.

Witnesses:
W. H. BRADY,
L. C. HILLS.